Feb. 6, 1951        VE ELIZABETH CADIE        2,540,075
HANDLE CONSTRUCTION
Filed Aug. 30, 1945
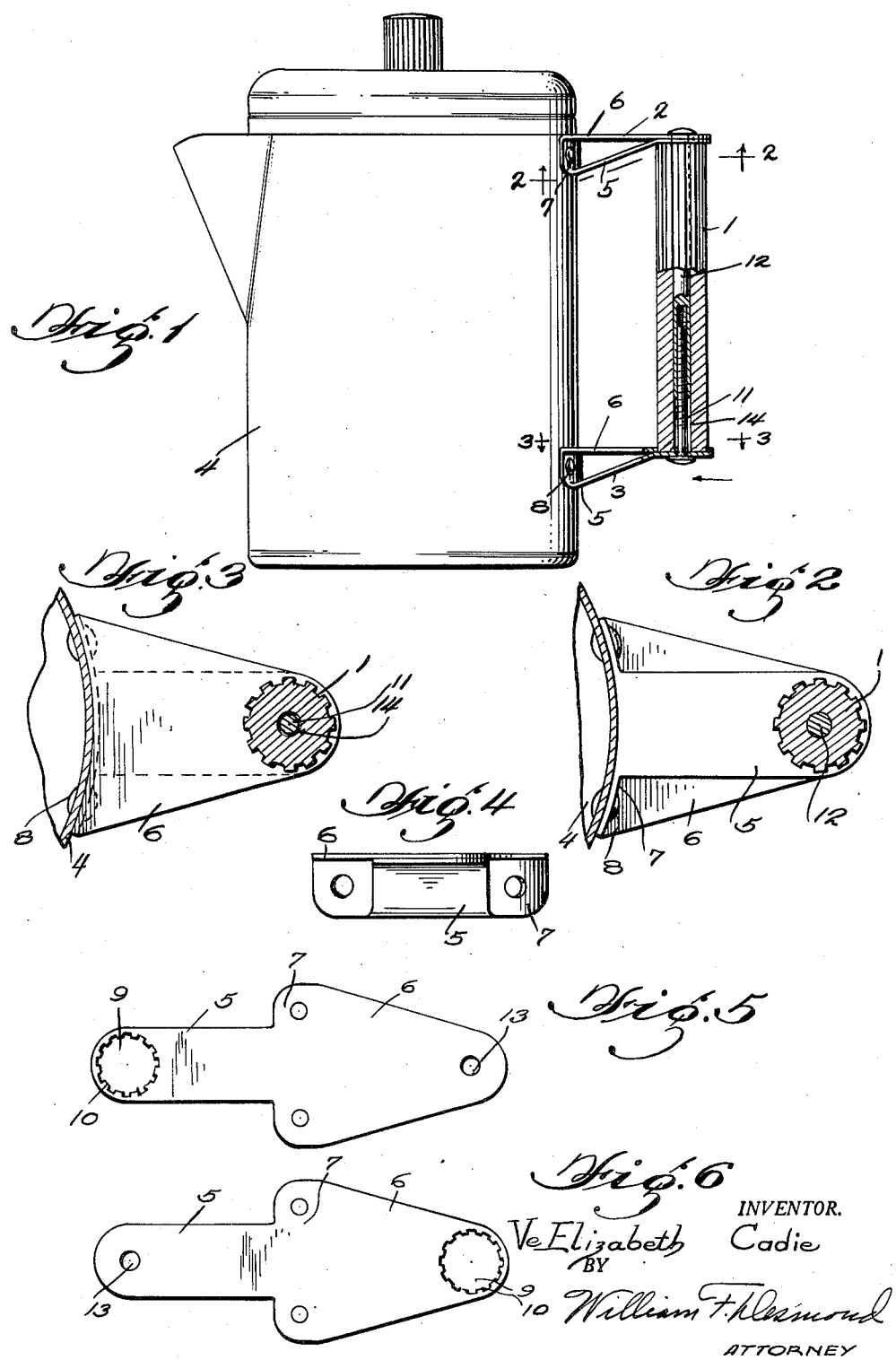
INVENTOR.
Ve Elizabeth Cadie
BY
William F. Desmond
ATTORNEY Patented Feb. 6, 1951

2,540,075

UNITED STATES PATENT OFFICE 2,540,075

HANDLE CONSTRUCTION

Ve Elizabeth Cadie, Alexandria, Va.

Application August 30, 1945, Serial No. 613,688

3 Claims. (Cl. 16—125)

(Granted under the act of March 3, 1883, as amended April 30, 1928; 370 O. G. 757)

The invention described herein, if patented may be manufactured and used by or for the Government for governmental purposes, without the payment to me of any royalty thereon.

This invention relates generally to a handle construction and has particular relation to a handle construction for a coffee pot, a receptacle, or an iron.

An object of this invention is to provide an improved handle construction having a bracket with a handle opening for supporting a handle in such manner as to prevent said handle from rotating or turning.

Another object of this invention is to provide an improved handle construction having brackets with serrated openings and having a serrated handle fitting in the serrated openings and wherein the serrations hold the handle rigidly without any possibility of turning.

A further object of this invention is to provide an improved handle construction comprising a bracket made of sheet metal and folded on itself to form an upper and a lower arm in the form of a triangle, and with one of said arms being provided with a serrated hole to carry a serrated handle and the other arm forming an abutment for the end face of the handle.

Other objects and advantages of the present invention will appear in the following detailed description and be particularly pointed out in the appended claims, reference being had to the accompanying drawing forming part of this specification; and in which:

Figure 1 is an elevational view, partly broken away, of the handle construction as applied to a pot;

Figure 2 is a sectional view taken along line 2—2 of Figure 1, showing the serrated handle;

Figure 3 is a sectional view taken along line 3—3 of Figure 1;

Figure 4 is an elevational view of the bracket itself looking in the direction of the arrow in Figure 1;

Figure 5 is a plan view of the upper bracket prior to being folded; and

Figure 6 is a plan view of the lower bracket prior to being folded.

The specific receptacle shown in Figure 1 is the subject matter of a copending design application, Ser. No. 121,755, filed August 30, 1945, now Design Patent No. 144,354.

Referring to the drawing, the handle construction comprises a handle 1 carried by upper bracket 2 and lower bracket 3 affixed to a pot or other article 4, as shown in Figure 1. The handle is made of wood, composition or metal. Each bracket comprises a length of sheet metal material as can be seen in Figures 5 and 6 with a narrow portion 5, a triangular portion 6, and a central portion 7. In construction, each bracket is bent or folded on itself as seen in Figure 1 so that the narrow portion 5 forms the lower arm and the triangular portion 6 forms the upper arm. The end of the lower arm is bent to lie flat against the upper arm. The central or body portion 7 is curved to conform with the curvature of the pot or receptacle, to which it is fastened by any suitable means, as by rivets 8.

As seen in Figures 5 and 6, each bracket has an opening 9 therethrough whose edge 10 is continuously notched or serrated, the upper bracket, Figure 5, having the opening in the narrow portion or lower arm 5, and the lower bracket, Figure 6, having the opening in the triangular portion or upper arm 6. It will thus be apparent that when the bracket blanks are folded into form as indicated in Fig. 1, the opening 9 is closed on the outer side so as to provide a socket or depression formed with a serrated wall. It is to be noted that the handle 1, as seen in Figures 1, 2 and 3 is circular in cross-section, and has its surface longitudinally notched or serrated to conform in size and shape with the notches or serrations 10 in the bracket openings. Thus when the brackets receive the handle, the ends of the handle are inserted in handle openings 9 of the brackets and due to the notches or serrations is prevented from rotating or turning. In this position the end faces of the handle abut against the triangular portion 6 of the upper bracket and the narrow portion 5 of the lower bracket to further lend rigidity to the construction and prevent endwise movement of the handle.

To fasten all the parts in assembled relation a binding screw 11 is threaded into bolt 12 which is internally threaded and the screw and bolt extend through bracket openings 13 and opening 14 through the handle.

In the handle construction of this invention it is evident that a simple, rigid construction is provided. The double arms of the brackets provide additional strength. Also the use of handle openings only in one of the arms of each bracket, the other arm serving as an abutment for the end face of the handle, provides a structure which is rigid and easy to manufacture. In this construction even if screw 11 should become loose, the handle 1 would still be rigidly held by the serrated handle openings 9 and the abutting faces of the upper arm of the upper bracket and the lower arm of the lower bracket.

While the invention has been described in more or less detail, it is not to be limited thereby, as changes may be made in the form, arrangement and construction of parts, and equivalents may be substituted, without departing from the spirit and the scope of the invention, the form hereinbefore described being merely a preferred embodiment thereof.

What I claim is:

1. A handle construction comprising a handle, an upper bracket, and a lower bracket, each of said brackets comprising an upper arm and a lower arm, the lower arm of the upper bracket and the upper arm of the lower bracket each being formed with an opening therethrough, serrations in the edges of said openings, and said handle having serrations conforming in shape and size to the serrations of said openings, whereby when said openings receive the ends of said handle, the serrations cooperate to prevent said handle from rotating and the end faces of the handle abut the lower arm of the lower bracket and the upper arm of the upper bracket.

2. A handle construction as claimed in claim 1, wherein a binding screw is provided extending through said bracket arms and said handle, whereby said binding screw fastens the upper arm of the upper bracket, the handle, and the lower arm of the lower bracket in abutting relationship.

3. A handle construction comprising a handle, an upper bracket, a lower bracket, each of said brackets comprising an upper arm and a lower arm, the lower arm of the upper bracket and the upper arm of the lower bracket each being formed with a non-circular opening, and said handle having non-circular ends conforming in shape and size to said non-circular openings, whereby when said openings receive the ends of the handle, the non-circular shape of the openings and handle ends cooperate to prevent said handle from rotating and the end faces of the handle abut the lower arm of the lower bracket and the upper arm of the upper bracket.

VE ELIZABETH CADIE.

REFERENCES CITED

The following references are of record in the file of this patent:

UNITED STATES PATENTS

| Number | Name | Date |
|---|---|---|
| 527,182 | Pierce | Oct. 9, 1894 |
| 824,746 | Schaffer | July 3, 1906 |
| 1,477,092 | Welsh | Dec. 11, 1923 |
| 1,706,648 | Blaskewitz et al. | Mar. 26, 1929 |
| 1,751,414 | Marienthal | Mar. 18, 1930 |